(12) United States Patent
Kim et al.

(10) Patent No.: US 10,923,767 B2
(45) Date of Patent: Feb. 16, 2021

(54) ORGANIC ELECTROLYTE SOLUTION AND LITHIUM BATTERY INCLUDING ORGANIC ELECTROLYTE SOLUTION

(71) Applicant: SAMSUNG SDI CO., LTD., Yongin-si (KR)

(72) Inventors: AeRan Kim, Yongin-si (KR); MiYoung Son, Yongin-si (KR); HyunBong Choi, Yongin-si (KR); MyungHeui Woo, Yongin-si (KR); SeungTae Lee, Yongin-si (KR); HaRim Lee, Yongin-si (KR); AeHui Goh, Yongin-si (KR); WooCheol Shin, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 127 days.

(21) Appl. No.: 15/485,343

(22) Filed: Apr. 12, 2017

(65) Prior Publication Data

US 2017/0309959 A1    Oct. 26, 2017

(30) Foreign Application Priority Data

Apr. 22, 2016  (KR) .......................... 10-2016-0049397

(51) Int. Cl.
*H01M 10/0567*    (2010.01)
*H01M 4/131*    (2010.01)
(Continued)

(52) U.S. Cl.
CPC ....... *H01M 10/0567* (2013.01); *H01M 4/131* (2013.01); *H01M 4/133* (2013.01);
(Continued)

(58) Field of Classification Search
CPC ....................................... H01M 10/0566–0569
See application file for complete search history.

(56) References Cited

U.S. PATENT DOCUMENTS

2010/0255369 A1    10/2010 Hwang et al.
2012/0085967 A1*    4/2012 Yokoyama ......... C01G 45/1228
                                                          252/182.1
(Continued)

FOREIGN PATENT DOCUMENTS

JP    2007-172990 A    7/2007
JP    2010-225522 A    10/2010
(Continued)

OTHER PUBLICATIONS

Machine translation of JP2007172990A (Year: 2007).*

*Primary Examiner* — Eric R Smith
(74) *Attorney, Agent, or Firm* — Lee IP Law, P.C.

(57) ABSTRACT

An organic electrolyte solution and a lithium battery, the organic electrolyte solution including an organic solvent; a lithium salt; a first compound, the first compound being represented by Formula 1 or Formula 2; and a second compound, the second compound being a succinonitrile-based compound represented by Formula 3:

Formula 1

Formula 2

(Continued)

-continued

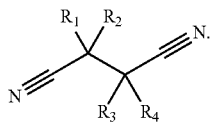

Formula 3

17 Claims, 2 Drawing Sheets (51) Int. Cl.
*H01M 4/133* (2010.01)
*H01M 4/525* (2010.01)
*H01M 4/587* (2010.01)
*H01M 10/0525* (2010.01)
*H01M 10/0568* (2010.01)
*H01M 10/0569* (2010.01)
*H01M 4/02* (2006.01)

(52) U.S. Cl.
CPC ........... *H01M 4/525* (2013.01); *H01M 4/587* (2013.01); *H01M 10/0525* (2013.01); *H01M 10/0568* (2013.01); *H01M 10/0569* (2013.01); *H01M 2004/027* (2013.01); *H01M 2004/028* (2013.01); *H01M 2300/0028* (2013.01); *Y02T 10/70* (2013.01)

(56) References Cited

U.S. PATENT DOCUMENTS

2015/0311566 A1 10/2015 Hayakawa et al.
2016/0164077 A1* 6/2016 Hwang ................. H01M 4/485
429/188

FOREIGN PATENT DOCUMENTS

| JP | 2011-049097 A | 3/2011 |
| KR | 10-2009-0039211 A | 4/2009 |
| KR | 10-2010-0109709 A | 10/2010 |
| KR | 10-2015-0062154 A | 6/2015 |
| WO | WO-2016188884 A1 * | 12/2016 |

* cited by examiner

ORGANIC ELECTROLYTE SOLUTION AND LITHIUM BATTERY INCLUDING ORGANIC ELECTROLYTE SOLUTION

CROSS-REFERENCE TO RELATED APPLICATION

Korean Patent Application No. 10-2016-0049397, filed on Apr. 22, 2016, in the Korean Intellectual Property Office, and entitled: "Organic Electrolytic Solution and Lithium Battery Comprising Organic Electrolyte Solution," is incorporated by reference herein in its entirety.

BACKGROUND

1. Field

Embodiments relate to an organic electrolyte solution and a lithium battery including the organic electrolyte solution.

2. Description of the Related Art

Lithium batteries may be used as driving sources of portable electronic devices, such as camcorders, mobile phones, and laptop computers. Lithium secondary batteries may be rechargeable at high rates and may have a high energy density per unit weight of about three times higher than that of the conventional lead storage batteries, nickel-cadmium (Ni—Cd) batteries, nickel-hydrogen batteries, or nickel-zinc batteries.

SUMMARY

Embodiments are directed to an organic electrolyte solution and a lithium battery including the organic electrolyte solution.

The embodiments may be realized by providing an organic electrolyte solution including an organic solvent; a lithium salt; a first compound, the first compound being represented by Formula 1 or Formula 2; and a second compound, the second compound being a succinonitrile-based compound represented by Formula 3:

Formula 1

Formula 2

Formula 3 wherein, in Formulae 1, 2, and 3, X is sulfur (S) or phosphorus (P), L is selected from a substituted or unsubstituted $C_1$-$C_5$ alkylene group, a substituted or unsubstituted $C_4$-$C_{10}$ cycloalkylene, a substituted or unsubstituted $C_5$-$C_{10}$ arylene group, a substituted or unsubstituted $C_2$-$C_{10}$, a substituted or unsubstituted $C_2$-$C_{10}$ alkenylene group, a substituted or unsubstituted $C_2$-$C_{10}$ alkynylene group, a substituted or unsubstituted $C_1$-$C_5$ alkoxy alkylene group, and a substituted or unsubstituted $C_1$-$C_5$ dialkoxy alkylene group, R is selected from a substituted or unsubstituted $C_1$-$C_5$ alkyl group, a substituted or unsubstituted $C_4$-$C_{10}$ cycloalkyl group, a substituted or unsubstituted $C_5$-$C_{10}$ aryl group, a substituted or unsubstituted $C_2$-$C_{10}$ heteroaryl group, a $C_2$-$C_{10}$ alkenyl group, a substituted or unsubstituted $C_2$-$C_{10}$ alkynyl group, a substituted or unsubstituted $C_1$-$C_5$ alkoxy alkyl group, a substituted or unsubstituted $C_1$-$C_5$ dialkoxy alkyl group, a substituted or unsubstituted $C_1$-$C_5$ alkyleneamine group, and —Si($R_i$)($R_j$)($R_k$), wherein $R_i$, $R_j$, and $R_k$ are each independently a substituted or unsubstituted $C_1$-$C_5$ alkyl group, M is an alkali metal or an alkaline earth-metal, m is an integer of 0 to 10, n is an integer of 1 to 4, and $R_1$, $R_2$, $R_3$, and $R_4$ are each independently selected from hydrogen, a substituted or unsubstituted $C_1$-$C_5$ alkyl group, a substituted or unsubstituted $C_4$-$C_{10}$ cycloalkyl group, a substituted or unsubstituted $C_5$-$C_{10}$ aryl group, a substituted or unsubstituted $C_2$-$C_{10}$ heteroaryl group, a substituted or unsubstituted $C_2$-$C_{10}$ alkenyl group, a substituted or unsubstituted $C_2$-$C_{10}$ alkynyl group, a substituted or unsubstituted $C_1$-$C_5$ alkoxy group, a substituted or unsubstituted $C_1$-$C_5$ dialkoxy group, a substituted or unsubstituted $C_1$-$C_5$ alkylene amine group, and —Si($R_g$)($R_h$)($R_i$), wherein $R_g$, $R_h$, and $R_i$ are each independently a substituted or unsubstituted $C_1$-$C_5$ alkyl group.

m may be an integer of 1 to 10, and L may be selected from an unsubstituted $C_1$-$C_5$ alkylene group and an unsubstituted $C_1$-$C_5$ dialkoxy alkylene group.

R may be selected from an unsubstituted $C_1$-$C_5$ alkyl group and an unsubstituted $C_2$-$C_{10}$ alkenyl group.

The first compound may be represented by Formula 1, and the first compound represented by Formula 1 may be represented by one of Formulae 1A to 1D:

Formula 1A

Formula 1B

Formula 1C

Formula 1D wherein, in Formulae 1A, 1B, 1C, and 1D, m is an integer of 0 to 10, and n is an integer of 1 to 4.

The first compound may be represented by Formula 2, and the first compound represented by Formula 2 may be represented by one of Formulae 2A to 2D:

Formula 2A

Formula 2B

Formula 2C

Formula 2D wherein, in Formulae 2A, 2B, 2C, and 2D, m is an integer of 0 to 10, and n is an integer of 1 to 4.

The organic electrolyte solution may include the first compound in an amount of about 0.01 percent by weight (wt %) to about 5 wt %, based on a total weight of the organic electrolyte solution.

The organic electrolyte solution may include the second compound in an amount of about 0.01 wt % to about 10 wt %, based on a total weight of the organic electrolyte solution.

A weight ratio of the first compound to the second compound may be about 1:1 to about 1:5.

The organic solvent may include at least one of ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), butylene carbonate, ethyl propionate (EP), ethyl butyrate, acetonitrile, dimethyl sulfoxide, dimethylformamide, dimethylacetamide, γ-valerolactone, γ-butyrolactone (GBL), and tetrahydrofuran.

The lithium salt may include at least one of $LiPF_6$, $LiBF_4$, $LiSbF_6$, $LiAsF_6$, $LiClO_4$, LiBr, $CH_3SO_3Li$, $(CF_3SO_2)_2NLi$, chloroborane lithium, lower aliphatic carbonic acid lithium, 4-phenyl boric acid lithium, imide, $LiCF_3SO_3$, $LiCF_3CO_2$, $LiB_{10}C_{10}$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$, in which x and y are each an integer of 1 to 20, LiCl, and LiI.

A concentration of the lithium salt may be about 0.01 M to about 5.0 M.

The embodiments may be realized by providing a lithium battery including a positive electrode; a negative electrode; and the organic electrolyte solution according to an embodiment.

The negative electrode may include graphite.

The positive electrode may include a positive active material having a layered structure.

An operating voltage of the lithium battery may be 4.2 volts (V) or greater.

The positive active material may be represented by Formula 4:

$LiCo_{1-x}M'_sO_2$      Formula 4 wherein, in Formula 4, M' may be at least one of nickel (Ni), manganese (Mn), aluminum (Al), copper (Cu), iron (Fe), magnesium (Mg), chromium (Cr), zinc (Zn), boron (B), and gallium (Ga), and 0≤s≤0.5.

The positive active material may be represented by Formula 5:

$Li_t(Ni_{1-u-v}Co_uAl_v)O_2$      Formula 5 wherein, in Formula 5, 0.96≤t≤1.05, 0≤u≤0.2, and 0≤v≤0.1.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present.

Like reference numerals refer to like elements throughout. As used herein, the terms "or" and "and/or" includes any and all combinations of one or more of the associated listed items. Expressions such as "at least one of," when preceding a list of elements, modify the entire list of elements and do not modify the individual elements of the list.

Hereinafter an organic electrolyte solution for a lithium battery and a lithium battery including the organic electrolyte solution, according to one or more embodiments, will be described in detail.

According to one or more embodiments, the organic electrolyte solution for a lithium battery may include, e.g., an organic solvent; a lithium salt; a first compound, e.g., Compound (A), represented by Formula 1 or Formula 2; and a second compound, e.g., a succinonitrile-based compound (Compound (B)) represented by Formula 3.

Formula 1

-continued

Formula 2

Formula 3

X may be, e.g., sulfur (S) or phosphorus (P). L may be selected from, e.g., a $C_1$-$C_5$ alkylene group substituted or unsubstituted with halogen (e.g., L may be unsubstituted, or may be substituted with a halogen), a $C_4$-$C_{10}$ cycloalkylene group substituted or unsubstituted with halogen, a $C_5$-$C_{10}$ arylene group substituted or unsubstituted with halogen, a $C_2$-$C_{10}$ heteroarylene group substituted or unsubstituted with halogen, a $C_2$-$C_{10}$ alkenylene group substituted or unsubstituted with halogen, a $C_2$-$C_{10}$ alkynylene group substituted or unsubstituted with halogen, a $C_1$-$C_5$ alkoxy alkylene group substituted or unsubstituted with halogen, and a $C_1$-$C_5$ dialkoxy alkylene group substituted or unsubstituted with halogen. R may be selected from, e.g., a $C_1$-$C_5$ alkyl group substituted or unsubstituted with halogen, a $C_4$-$C_{10}$ cycloalkyl group substituted or unsubstituted with halogen, a $C_5$-$C_{10}$ aryl group substituted or unsubstituted with halogen, a $C_2$-$C_{10}$ heteroaryl group substituted or unsubstituted with halogen, a $C_2$-$C_{10}$ alkenyl group substituted or unsubstituted with halogen, a $C_2$-$C_{10}$ alkynyl group substituted or unsubstituted with halogen, a $C_1$-$C_5$ alkoxy alkyl group substituted or unsubstituted with halogen, a $C_1$-$C_5$ dialkoxy alkyl group substituted or unsubstituted with halogen, a $C_1$-$C_5$ alkyleneamine group substituted or unsubstituted with halogen, and —Si($R_i$)($R_j$)($R_k$), wherein $R_i$, $R_j$, and $R_k$ may each independently be a $C_1$-$C_5$ alkyl group substituted or unsubstituted with halogen. M may be, e.g., an alkali metal or an alkaline earth-metal. m may be, e.g., an integer of 0 to 10. n may be, e.g., an integer of 1 to 4. $R_1$, $R_2$, $R_3$, and $R_4$ may each independently be selected from, e.g., hydrogen, a $C_1$-$C_5$ alkyl group substituted or unsubstituted with halogen, a $C_4$-$C_{10}$ cycloalkyl group substituted or unsubstituted with halogen, a $C_5$-$C_{10}$ aryl group substituted or unsubstituted with halogen, a $C_2$-$C_{10}$ heteroaryl group substituted or unsubstituted with halogen, a $C_2$-$C_{10}$ alkenyl group substituted or unsubstituted with halogen, a $C_2$-$C_{10}$ alkynyl group substituted or unsubstituted with halogen, a $C_1$-$C_5$ alkoxy group substituted or unsubstituted with halogen, a $C_1$-$C_5$ dialkoxy group substituted or unsubstituted with halogen, a $C_1$-$C_5$ alkylene amine group substituted or unsubstituted with halogen, and —Si($R_g$)($R_h$)($R_i$), wherein $R_g$, $R_h$, and $R_i$ may each independently be a $C_1$-$C_5$ alkyl group substituted or unsubstituted with halogen.

The first compound represented by Formula 1 or 2 and the succinonitrile-based second compound represented by Formula 3 may be added to a lithium battery electrolyte solution to help improve battery characteristics, e.g., reduction of lithium battery thickness increase rate and improvement of recovery capacity, at high temperatures.

Hereinafter, improvement in performance of a lithium battery (by addition of the first compound and the second compound into an electrolyte solution of the lithium battery) will be described in greater detail. However, the description is for understanding the inventive concept only and is not intended to be limiting.

In general, when charging and discharging a lithium battery, an irreversible reaction using excess charges may occur. The irreversible reaction may result in a passivation layer, such as a solid electrolyte interface (SEI) layer, being formed on a negative electrode surface. The SEI layer may help prevent decomposition of an electrolyte solution and may also serve as an ion channel during charging and discharging. The higher the stability of the SEI layer and the lower the resistance of the SEI layer, the longer the lifespan of the lithium battery may be. The irreversible reaction may also help form a protection layer on a positive electrode surface. The protection layer may help prevent decomposition of an electrolyte solution and may also serve as an ion channel during charging and discharging. The higher the stability of the protection layer at high temperatures, the longer the lifespan of the lithium battery may be.

A sulfone group or a phosphinate group included in the first compound may be reduced by itself by accepting electrons from a negative electrode surface during charging, or may react with a previously reduced polar solvent molecule, thereby affecting characteristics of an SEI layer formed on the negative electrode surface. For example, the first compound including the sulfone group may more likely accept electrons from a negative electrode, compared to polar solvents. For example, the first compound may be reduced at a lower voltage than a polar solvent before the polar solvent is reduced. For example, the first compound including the sulfone group may be more apt to be reduced and/or decomposed into radicals and/or ions during charging. Consequently, the radicals and/or ions may bind with lithium ions to form an appropriate SEI layer on the negative electrode, thereby preventing further decomposition of the solvent. The first compound may form a covalent bond with, e.g., a carbonaceous negative electrode itself or a variety of functional groups on a surface of the carbonaceous negative electrode, or may be adsorbed onto a surface of the negative electrode, thereby forming a modified SEI layer with improved stability. The modified SEI layer formed by such binding and/or adsorption may be more durable even after charging and discharging for a long time, compared to an SEI layer formed from only an organic solvent and a lithium salt. The more stable modified SEI layer may in turn more effectively block intercalation of the organic solvent solvating lithium ions during intercalation of the lithium ions into the negative electrode. Accordingly, the modified SEI layer may more effectively block direct contact between the organic solvent and the negative electrode to further improve reversibility of intercalation and deintercalation of lithium ions, and consequently improve the lifespan characteristics of the lithium battery.

In addition, due to the inclusion of the sulfone group, the first compound may be coordinated on a positive electrode surface, thereby affecting characteristics of a protection layer formed on the positive electrode surface. For example, the sulfone group may form a complex by being coordinated by transition metal ions of a positive active material. This complex may form a modified protection layer with improved stability that is more durable even after charging and discharging for a long time, compared to a protection layer formed from only an organic solvent. The more stable modified protection layer may in turn more effectively block intercalation of the organic solvent solvating the lithium ions during intercalation of the lithium ions into the negative electrode. Accordingly, the modified protection layer may more effectively block direct contact between the organic solvent and the positive electrode to further improve reversibility of intercalation and deintercalation of lithium ions, and consequently improve the stability and the lifespan characteristics of the lithium battery.

For example, the first compound may form an SEI layer on a negative electrode surface and/or a protection layer on a positive electrode surface, thus having improved thermal stability, which results in improvement of high-temperature stability of the lithium battery.

The second compound, e.g., the succinonitrile-based compound, may help stabilize a lithium salt or pyrolyzate of the lithium salt that present in an organic electrolyte solution by being coordinated on dissociated anions. As the pyrolyzate of the lithium salt or the dissociated anions are stabilized, side reactions between the pyrolyzate or the dissociated anions and an organic electrolyte solution may be suppressed. Accordingly, the lifespan characteristics and high-temperature stability of the lithium battery may improve.

In an implementation, in the first compound represented by Formula 1 or 2, L may be selected from, e.g., a substituted or unsubstituted $C_1$-$C_5$ alkylene group and a substituted or unsubstituted $C_1$-$C_5$ dialkoxy alkylene group.

In an implementation, in the first compound represented by Formula 1 or 2, a substituent of the substituted $C_1$-$C_5$ alkylene group or the substituted $C_1$-$C_5$ dialkoxy alkylene group may be selected from, e.g., halogen, a methyl group, an ethyl group, a propyl group, an iso-propyl group, a butyl group, a tert-butyl group, a trifluoromethyl group, a tetrafluoroethyl group, a phenyl group, a naphthyl group, a tetrafluorophenyl group, a pyrrolyl group, and a pyridinyl group. In an implementation, the substituent of the substituted $C_1$-$C_5$ alkylene group or the substituted $C_1$-$C_5$ dialkoxy alkylene group may be a suitable substituent for an alkylene group or a dialkoxy alkylene group.

In an implementation, in the first compound represented by Formula 1 or 2, L may be selected from, e.g., an unsubstituted $C_1$-$C_5$ alkylene group and an unsubstituted $C_1$-$C_5$ dialkoxy alkylene group.

In an implementation, in the first compound represented by Formula 1 or 2, R may be selected from, e.g., a substituted or unsubstituted $C_1$-$C_5$ alkyl group and a substituted or unsubstituted $C_2$-$C_{10}$ alkenyl group.

In an implementation, in the first compound represented by Formula 1 or 2, a substituent of the substituted $C_1$-$C_5$ alkyl group or the substituted $C_2$ to $C_{10}$ alkenyl group may be selected from, e.g., halogen, a methyl group, an ethyl group, a propyl group, an iso-propyl group, a butyl group, a tert-butyl group, a trifluoromethyl group, a tetrafluoroethyl group, a phenyl group, a naphthyl group, a tetrafluorophenyl group, a pyrrolyl group, and a pyridinyl group. The substituent of the substituted $C_1$-$C_5$ alkyl group or the substituted $C_2$ to $C_{10}$ alkenyl group may be a suitable substituent for an alkyl group or an alkenyl group.

In an implementation, in the first compound represented by Formula 1 or 2, R may be selected from, e.g., an unsubstituted $C_1$-$C_5$ alkyl group or an unsubstituted $C_2$-$C_{10}$ alkenyl group.

In an implementation, the first compound represented by Formula 1 may be represented by one of Formulae 1A to 1D.

Formula 1A

Formula 1B

Formula 1C

Formula 1D

In Formulae 1A, 1B, 1C, and 1D, m may be an integer of 0 to 10, and n may be an integer of 1 to 4.

In an implementation, the first compound represented by Formula 2 may be represented by one of Formulae 2A to 2D.

Formula 2A

Formula 2B

Formula 2C

Formula 2D

In Formulae 2A, 2B, 2C, and 2D, m may be an integer of 0 to 10, and n may be an integer of 1 to 4.

P and Q in the term "$C_P$-$C_Q$" as used herein refer to the number of carbons in a particular functional group. For example, a functional group may include from P to Q carbon atoms. For example, a "$C_1$-$C_4$ alkyl group" refers to an alkyl group having 1 to 4 carbon atoms, such as $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, or $(CH_3)_3C$—.

As used herein, a particular radical may refer to a mono-radical or a di-radical depending on the context. For example, when a substituent needs two binding sites to bind with the rest of the molecule, the substituent may be understood as a di-radical. For example, a substituent specified as an alkyl group that needs two binding sites may be a di-radical, such as —$CH_2$—, —$CH_2CH_2$—, or —$CH_2CH(CH_3)CH_2$—. The term "alkylene" clearly indicates that the radical is a di-radical.

The term "alkyl group" or "alkylene group" as used herein refers to a branched or unbranched aliphatic hydrocarbon group. In some embodiments, an alkyl group may be substituted or unsubstituted. Examples of the alkyl group may include a methyl group, an ethyl group, a propyl group, an iso-propyl group, a butyl group, an isobutyl group, a tert-butyl group, a pentyl group, a hexyl group, a cyclopropyl group, a cyclopentyl group, a cyclohexyl group, and a cycloheptyl group, each of which may optionally be substituted or unsubstituted. In some embodiments, an alkyl group may have 1 to 5 carbon atoms. Examples of a $C_1$-$C_5$ alkyl group may include a methyl group, an ethyl group, a propyl group, an isopropyl group, a butyl group, an isobutyl group, a sec-butyl group, a pentyl group, a 3-pentyl group, and a hexyl group.

The term "cycloalkyl group" or "cycloalkylene group" refers to a carbocyclic ring or ring system that is fully saturated. For example, the "cycloalkyl group" may refer to a cyclopropyl group, a cyclobutyl group, a cyclopentyl group, or a cyclohexyl group.

The term "alkenyl group" or "alkenylene group" as used herein refers to a hydrocarbon group including 2 to 10 carbon atoms with at least one carbon-carbon double bond. Examples thereof may include an ethenyl group, a 1-prophenyl group, a 2-prophenyl group, a 2-methyl-1-prophenyl group, a 1-butenyl group, a 2-butenyl group, a cyclopropenyl group, a cyclopentenyl group, a cyclohexenyl group, and a cycloheptenyl group. For example, an alkenyl group may be substituted or unsubstituted. In some embodiments, an alkenyl group may have 2 to 10 carbon atoms.

The term "alkynyl group" or "alkynylene group" as used herein refers to a hydrocarbon group including 2 to 10 carbon atoms with at least one carbon-carbon triple bond. Examples thereof may include an ethynyl group, a 1-propynyl group, a 1-butynyl group, and a 2-butynyl group. For example, an alkynyl group may be substituted or unsubstituted. In some embodiments, an alkynyl group may have 2 to 10 carbon atoms.

The term "alkoxy alkyl group" or "alkoxy alkylene group" as used herein refers to a hydrocarbon group including 2 to 10 carbon atoms and an alkoxy group. Examples thereof may include a methoxy methyl group, an ethoxy methyl group, an ethoxy ethyl group, a methoxy propyl group, and a methoxy butyl group. In some embodiments, an alkoxy alkyl group may be substituted or unsubstituted.

The term "dialkoxy alkyl group" or "dialkoxy alkylene group" as used herein refers to a hydrocarbon group including 2 to 10 carbon atoms and two alkoxy groups. Examples thereof may include a dimethoxy methyl group, a diethoxy methyl group, a diethoxy ethyl group, a dimethoxy propyl group, and a dimethoxy butyl group. In some embodiments, a dialkoxy alkyl group may be substituted or unsubstituted.

The term "aryl group" or "arylene group" as used herein refers to an aromatic ring or ring system (i.e., a ring fused from at least two rings, which shares two or more adjacent carbon atoms) of at least two rings including only carbon atoms in its backbone. When the aryl group is a ring system, each ring in the ring system may be aromatic. Examples of the aryl group may include a phenyl group, a biphenyl group, a naphthyl group, a phenanthrenyl group, and a naphthacenyl group. In some embodiments, an aryl group may be substituted or unsubstituted.

The term "heteroaryl group" or "heteroarylene group" as used herein refers to an aromatic ring system with one or plural fused rings, in which at least one member of a ring is a heteroatom, i.e., not carbon. In the fused ring system, at least one heteroatom may be in one of the rings. For example, the heteroatom may be oxygen, sulfur, or nitrogen, but is not limited thereto. Examples of the heteroaryl group may include a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, and an indolyl group.

The term "halogen" as used herein refers to a stable atom belonging to Group 17 of the periodic table of elements, e.g., fluorine, chlorine, bromine, or iodine. For example, the halogen atom may be fluorine and/or chlorine.

As used herein, a substituent may be derived by substitution of at least one hydrogen atom in an unsubstituted mother group with another atom or a functional group. Unless stated otherwise, a substituted functional group refers to a functional group substituted with at least one substituent selected from a $C_1$-$C_{10}$ alkyl group, a $C_2$-$C_{10}$ alkenyl group, a $C_3$-$C_{10}$ cycloalkyl group, and a $C_5$-$C_{10}$ aryl group. When a functional group is "optionally" substituted, it means that the functional group may be substituted with such a substituent as listed above.

In an implementation, an amount of the first compound represented by Formula 1 or 2 in the organic electrolyte solution may be in a range of, e.g., about 0.01 percent by weight (wt %) to about 10 wt %, based on the total weight of the organic electrolyte solution. The amount of the first compound may be appropriately adjusted as desired. In an implementation, the amount of the first compound may be in a range of, e.g., about 0.01 wt % to about 7 wt % based on the total weight of the organic electrolyte solution. In an implementation, the amount of the first compound may be in a range of, e.g., about 0.01 wt % to about 5 wt % based on the total weight of the organic electrolyte solution. In an implementation, the amount of the first compound may be in a range of, e.g., about 0.1 wt % to about 5 wt % based on the total weight of the organic electrolyte solution. In an implementation, the amount of the first compound may be in a range of, e.g., about 0.5 wt % to about 5 wt % based on the total weight of the organic electrolyte solution. In an implementation, the amount of the first compound may be in a range of, e.g., about 1 wt % to about 5 wt % based on the total weight of the organic electrolyte solution. In an implementation, the amount of the first compound may be in a range of, e.g., about 1 wt % to about 3 wt % based on the total weight of the organic electrolyte solution. When the amount of the first compound is within any of these ranges, the lithium battery including the organic electrolyte solution may have further improved battery characteristics. Maintaining the amount of the first compound at about 10 wt % or less, based on the total weight of the organic electrolyte solution, may help ensure that the lifespan of the lithium battery is not reduced.

In an implementation, the amount of the second compound represented by Formula 3 in the organic electrolyte solution may be in a range of, e.g., about 0.01 wt % to about 10 wt %, based on the total weight of the organic electrolyte solution. The amount of the second compound may be appropriately adjusted as desired. In an implementation, the amount of the second compound may be in a range of, e.g., about 0.1 wt % to about 10 wt % based on the total weight of the organic electrolyte solution. In an implementation, the amount of the second compound may be in a range of, e.g., about 0.1 wt % to about 7 wt % based on the total weight of the organic electrolyte solution. In an implementation, the amount of the second compound may be in a range of, e.g., about 0.1 wt % to about 5 wt % based on the total weight of the organic electrolyte solution. In an implementation, the amount of the second compound may be in a range of, e.g., about 0.2 wt % to about 5 wt % based on the total weight of the organic electrolyte solution. In an implementation, the amount of the second compound may be in a range of, e.g., about 0.3 wt % to about 5 wt % based on the total weight of the organic electrolyte solution. When the amount of the second compound is within any of these ranges, the lithium battery including the organic electrolyte solution may have further improved battery characteristics. Maintaining the amount of the second compound at about 10 wt % or less, based on the total weight of the organic electrolyte solution, may help ensure that the lifespan of the lithium battery is not reduced.

In an implementation, an amount ratio (e.g., weight ratio) of the first compound to the second compound in the organic electrolyte solution may be in a range of, e.g., about 1:1 to about 1:5.

The organic solvent used in the organic electrolyte solution may include a low-boiling point solvent. The low-boiling point solvent refers to a solvent having a boiling point of about 200° C. or less at 1 atmosphere.

Examples of the organic solvent may include a dialkyl carbonate, a cyclic carbonate, a linear or cyclic ester, a linear or cyclic amide, an alicyclic nitrile, a linear or cyclic ether, and a derivative thereof.

In an implementation, the organic solvent may include at least one selected from, e.g., dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC), fluoroethylene carbonate (FEC), butylene carbonate, ethyl propionate (EP), ethyl butyrate, acetonitrile, dimethyl sulfoxide, dimethylformamide, dimethylacetamide, γ-valerolactone, γ-butyrolactone (GBL), and tetrahydrofuran. For example, the organic solvent may include a suitable solvent having a low-boiling point.

A concentration of the lithium salt used in the organic electrolyte solution may be in a range of, e.g., about 0.01 molar (M) to about 5.0 M. The concentration of the lithium salt may be appropriately adjusted as desired. When the concentration of the lithium salt is within this range, a lithium battery including the organic electrolyte solution may have further improved battery characteristics.

The lithium salt used in the organic electrolyte solution may include a suitable lithium salt, e.g., $LiPF_6$, $LiBF_4$, $LiSbF_6$, $LiAsF_6$, $LiClO_4$, LiBr, $CH_3SO_3Li$, $(CF_3SO_2)_2NLi$, chloroborane lithium, lower aliphatic carbonic acid lithium, 4-phenyl boric acid lithium, imide, $LiCF_3SO_3$, $LiCF_3CO_2$, $LiB_{10}Cl_{10}$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may each be an integer selected from 1 to 20), LiCl, and LiI.

The organic electrolyte solution may be in a liquid or gel phase. The organic electrolyte solution may be prepared by adding a lithium salt and the first compound represented by Formula 1 or 2 and the second compound represented by Formula 3 into the organic solvent described above.

According to another embodiment, a lithium battery may include a positive electrode; a negative electrode, and the organic electrolyte solution according to the above-described embodiments. The lithium battery may be any type of a lithium battery, e.g., a lithium primary battery, or a lithium secondary battery, such as a lithium ion battery, a lithium ion polymer battery, or a lithium sulfur battery.

For example, the negative electrode of the lithium battery may include graphite. The operating voltage of the lithium battery may be about 4.2 volts (V) or greater, e.g., about 4.3 V or greater, for example, about 4.45 V or greater.

In one or more embodiments, the lithium battery may be manufactured in the following manner.

First, a positive electrode may be prepared.

For example, a positive active material, a conductive agent, a binder, and a solvent may be mixed to prepare a positive active material composition. In one or more embodiments, the positive active material composition may be directly coated on a metallic current collector to prepare a positive electrode plate. In one or more embodiments, the positive active material composition may be cast on a separate support to form a positive active material film, which may then be separated from the support and laminated on a metallic current collector to prepare a positive electrode plate.

The positive active material may be, e.g., may be a lithium-containing metal oxide. In one or more embodiments, the positive active material may be at least one of a composite oxide of lithium with a metal selected from among Co, Mn, Ni, and a combination thereof. In one or more embodiments, the positive active material may be a compound represented by one of the following formulae: $Li_aAl_{1-b}B^1{}_bD^1{}_2$ (where $0.90 \le a \le 1.8$, and $0 \le b \le 0.5$); $Li_aE_{1-b}B^1{}_bO_{2-c}D^1{}_c$ (where $0.90 \le a \le 1.8$, $0 \le b \le 0.5$, and $0 \le c \le 0.05$); $LiE_{2-b}B^1{}_bO_{4-c}D^1{}_c$ (where $0 \le b \le 0.5$ and $0 \le c \le 0.05$); $Li_aNi_{1-b-c}Co_bB^1{}_cD^1{}_\alpha$ (where $0.90 \le a \le 1.8$, $0 \le b \le 0.5$, $0 \le c \le 0.05$, and $0 \le \alpha \le 2$); $Li_aNi_{1-b}Co_bB^1{}_cO_{2-\alpha}F^1{}_\alpha$ (where $0.90 \le a \le 1.8$, $0 \le b \le 0.5$, $0 \le c \le 0.05$, and $0 < \alpha < 2$); $Li_aNi_{1-b-c}Co_bB^1{}_cO_{2-\alpha}F^1{}_2$ (where $0.90 \le a \le 1.8$, $0 \le b \le 0.5$, $0 \le c \le 0.05$, and $0 < \alpha < 2$); $Li_aNi_{1-b-c}Mn_bB^1{}_cD^1{}_\alpha$ (where $0.90 \le a \le 1.8$, $0 \le b \le 0.5$, $0 \le c \le 0.05$, and $0 < \alpha \le 2$); $Li_aNi_{1-b-c}Mn_bB^1{}_cO_{2-\alpha}F^1{}_2$ (where $0.90 \le a \le 1.8$, $0 \le b \le 0.5$, $0 \le c \le 0.05$, and $0 < \alpha < 2$); $Li_aNi_{1-b-c}Mn_bB^1{}_cO_{2-\alpha}F^1{}_2$ (where $0.90 \le a \le 1.8$, $0 \le b \le 0.5$, $0 \le c \le 0.05$, and $0 < \alpha < 2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$ and $0.001 \le b \le 50.1$); $Li_aCoG_bO_2$ (where $0.90 \le a \le 1.8$ and $0.001 \le b \le 0.1$); $Li_aMnG_bO_2$ (where $0.90 \le a \le 1.8$ and $0.001 \le b \le 0.1$); $Li_aMn_2G_bO_4$ (where $0.90 \le a \le 1.8$ and $0.001 \le b \le 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In the formulae above, A may be selected from nickel (Ni), cobalt (Co), manganese (Mn), and combinations thereof; $B^1$ may be selected from aluminum (Al), nickel (Ni), cobalt (Co), manganese (Mn), chromium (Cr), iron (Fe), magnesium (Mg), strontium (Sr), vanadium (V), a rare-earth element, and combinations thereof; $D^1$ may be selected from oxygen (O), fluorine (F), sulfur (S), phosphorus (P), and combinations thereof; E may be selected from cobalt (Co), manganese (Mn), and combinations thereof; $F^1$ may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q may be selected from titanium (Ti), molybdenum (Mo), manganese (Mn), and combinations thereof; $I^1$ may be selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

In one or more embodiments, the positive active material may be $LiCoO_2$, $LiMn_gO_{2g}$ (where g=1 or 2), $LiN_{1-g}Mn_gO_{2g}$ (where $0 < g < 1$), $LiNi_{1-g-k}Co_gMn_kO_2$ (where $0 \le g \le 0.5$ and $0 \le k \le 0.5$), or $LiFePO_4$.

In some embodiments, the positive electrode may include a positive active material having a layered structure.

In some embodiments, the positive active material may be represented by Formula 4.

$$LiCo_{1-x}M'_sO_2 \qquad \text{Formula 4}$$

In Formula 4, M' may include at least one selected of nickel (Ni), manganese (Mn), aluminum (Al), copper (Cu), iron (Fe), magnesium (Mg), chromium (Cr), zinc (Zn), boron (B), and gallium (Ga), and $0 \le s \le 0.5$.

In some embodiments, the positive active material may be represented by Formula 5

$$Li_t(Ni_{1-u-v}Co_uAl_v)O_2 \qquad \text{Formula 5}$$

In Formula 5, $0.96 \le t \le 1.05$, $0 \le u \le 0.2$, and $0 \le v \le 0.1$.

The compounds listed above as positive active materials may have a surface coating layer (hereinafter, also referred to as "coating layer"). In an implementation, a mixture of a compound without a coating layer and a compound having a coating layer, the compounds being selected from the compounds listed above, may be used. In one or more embodiments, the coating layer may include at least one compound of a coating element selected from the group consisting of oxide, hydroxide, oxyhydroxide, oxycarbonate, and hydroxycarbonate of the coating element. In one or more embodiments, the compounds for the coating layer may be amorphous or crystalline. In one or more embodiments, the coating element for the coating layer may include magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In one or more embodiments, the coating layer may be formed using any suitable method that does not adversely affect the physical properties of the positive active material when a compound of the coating element is used. For example, the coating layer may be formed using a spray coating method or a dipping method.

In one or more embodiments, the conductive agent may include, e.g., carbon black or graphite particulates. In an implementation, a suitable material may be used as a conductive agent.

Examples of the binder may include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer. A suitable material available as a binder may be used.

Examples of the solvent may include N-methyl-pyrrolidone, acetone, and water. A suitable material available as a solvent may be used.

The amounts of the positive active material, the conductive agent, the binder, and the solvent may be in ranges that are suitably used in lithium batteries. At least one of the conductive agent, the binder, and the solvent may be omitted according to the use and the structure of the lithium battery.

Next, a negative electrode may be prepared.

For example, a negative active material, a conductive agent, a binder, and a solvent may be mixed to prepare a negative active material composition. In one or more embodiments, the negative active material composition may be directly coated on a metallic current collector and dried to prepare a negative electrode plate. In one or more embodiments, the negative active material composition may be cast on a separate support to form a negative active material film, which may then be separated from the support and laminated on a metallic current collector to prepare a negative electrode plate.

In one or more embodiments, the negative active material may be a suitable negative active material for a lithium battery. For example, the negative active material may include at least one selected from lithium metal, a metal alloyable with lithium, a transition metal oxide, a non-transition metal oxide, and a carbonaceous material.

Examples of the metal alloyable with lithium may include Si, Sn, Al, Ge, Pb, Bi, Sb, a Si—Y' alloy (where Y' is an alkali metal, an alkaline earth-metal, a Group XIII element, a Group XIV element, a transition metal, a rare-earth element, or a combination thereof, and Y' is not Si), and a Sn—Y' alloy (where Y' is an alkali metal, an alkaline earth-metal, a Group XIII element, a Group XIV element, a transition metal, a rare-earth element, or a combination thereof, and Y' is not Sn). In one or more embodiments, Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), or tellurium (Te).

Examples of the transition metal oxide include a lithium titanium oxide, a vanadium oxide, and a lithium vanadium oxide.

Examples of the non-transition metal oxide include $SnO_2$ and $SiO_x$ (where $0<x<2$).

Examples of the carbonaceous material may include crystalline carbon, amorphous carbon, and mixtures thereof. Examples of the crystalline carbon may include graphite, such as natural graphite or artificial graphite that are in shapeless, plate, flake, spherical, or fibrous form. Examples of the amorphous carbon may include soft carbon (carbon sintered at low temperatures), hard carbon, meso-phase pitch carbides, and sintered cokes.

In one or more embodiments, the conductive agent, the binder, and the solvent used for the negative active material composition may be the same as those used for the positive active material composition.

The amounts of the negative active material, the conductive agent, the binder, and the solvent may be the same levels generally used in the art for lithium batteries. At least one of the conductive agent, the binder, and the solvent may be omitted according to the use and the structure of the lithium battery.

Next, a separator to be disposed between the positive electrode and the negative electrode may be prepared.

The separator for the lithium battery may be a suitable separator that is used in lithium batteries. In one or more embodiments, the separator may have low resistance to migration of ions in an electrolyte and have an excellent electrolyte solution-retaining ability. Examples of the separator may include glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

In one or more embodiments, a polymer resin, a filler, and a solvent may be mixed together to prepare a separator composition. Then, the separator composition may be directly coated on an electrode, and then dried to form the separator. In one or more embodiments, the separator composition may be cast on a support and then dried to form a separator film, which may then be separated from the support and laminated on an electrode to form the separator.

The polymer resin used to manufacture the separator may be a suitable material that is used as a binder for electrode plates. Examples of the polymer resin may include a vinylidenefluoride/hexafluoropropylene copolymer, polyvinylidene fluoride (PVDF), polyacrylonitrile, polymethylmethacrylate, and a mixture thereof.

The, the organic electrolyte solution, according to the above-described embodiments, is prepared.

In one or more embodiments, a plurality of battery assemblies may be stacked to form a battery pack, which may be used in a device that requires large capacity and high power, for example, in a laptop computer, a smart phone, or an electric vehicle.

The lithium battery may have improved lifespan characteristics and high rate characteristics, and thus may be used in an electric vehicle (EV), e.g., in a hybrid vehicle, such as a plug-in hybrid electric vehicle (PHEV). The lithium battery may be applicable to the high-power storage field. For example, the lithium battery may be used in an electric bicycle or a power tool.

Hereinafter embodiments will be described in detail with reference to Examples and Comparative Examples. These examples are for illustrative purposes only and are not intended to limit the scope of the application.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

(Preparation of Organic Electrolyte Solution)

Example 1

Into a 0.95 M of LiPF$_6$ solution in a mixed solvent including ethylene carbonate (EC), diethyl carbonate (DEC), ethyl propionate (EP), and γ-butyrolactone (GBL) at a volume ratio of 27:50:20:3, 1 wt % and 5 wt % of Compounds 1 and 2, each having a structure as shown below, respectively, were added to prepare an organic electrolyte solution:

Compound 1

Compound 2

Example 2

An organic electrolyte solution was prepared in the same manner as in Example 1, except that Compounds 1 and 2 were added in amounts of 2.5 wt % and 5 wt %, respectively.

Comparative Example 1

An organic electrolyte solution was prepared in the same manner as in Example 1, except that Compounds 1 and 2 were not added.

Comparative Example 2

An organic electrolyte solution was prepared in the same manner as in Example 1, except that Compound 1 was added in an amount of 1 wt %, and Compound 2 was not added.

Comparative Example 3

An organic electrolyte solution was prepared in the same manner as in Comparative Example 2, except that Compound 1 was added in an amount of 2.5 wt %.

Comparative Example 4

An organic electrolyte solution was prepared in the same manner as in Example 1, except that 1,3-propane sultone (PS) having a structure as shown below was added in an amount of 2.5 wt % in place of Compounds 1 and 2.

PS

Comparative Example 5

An organic electrolyte solution was prepared in the same manner as in Example 1, except that 1,3-propane sultone (PS) and Compound 2 were added in amounts of 1 wt % and 5 wt %, respectively.

Comparative Example 6

An organic electrolyte solution was prepared in the same manner as in Example 1, except that 1,3-propane sultone (PS) and Compound 2 were added in amounts of 2.5 wt % and 5 wt %, respectively.

Comparative Example 7

An organic electrolyte solution was prepared in the same manner as in Example 1, except that Compound 1 was not added, and Compound 2 was added in an amount of 5 wt %.

(Manufacture of Lithium Battery)

Example 3

(Manufacture of Positive Electrode)

About 97.0 wt % of LiCoO$_2$ as a positive active material, about 1.5 wt % carbon black as a conductive agent, and about 1.5 wt % of PVDF as a binder were mixed together and added to N-methyl-2-pyrrolidone as a solvent. The mixture was dispersed by using a mechanical stirrer for about 30 minutes to prepare a positive active material composition. The positive active material composition was coated on a 20 μm-thick aluminum foil current collector to a thickness of about 60 μm with a doctor blade. Then, the resultant was dried in a hot-air dryer at about 100° C. for about 0.5 hour, and then at about 120° C. in vacuum for about 4 hours, followed by roll-pressing to manufacture a positive electrode in which a positive active material was formed on a current collector.

(Manufacture of Negative Electrode)

About 98 wt % of graphite as a negative active material and about 2 wt % of a binder were mixed with distilled water and dispersed using a mechanical stirrer for about 60 minutes to prepare a negative active material composition. The negative active material composition was coated on a 10 μm-thick copper current collector to a thickness of about 60 μm with a doctor blade. Then, the resultant was dried in a hot-air dryer at about 100° C. for about 0.5 hour, and then at about 120° C. in vacuum for about 4 hours, followed by roll-pressing to manufacture a negative electrode in which a negative active material was formed on a current collector.

(Assembly of Lithium Battery)

The positive electrode, the negative electrode, a 18 μm-thick polyethylene separator coated with ceramic, and the organic electrolyte solution prepared in Example 1 as an electrolyte solution were used to manufacture a lithium battery.

Example 4

A lithium battery was manufactured in the same manner as in Example 3, except that the organic electrolyte solution prepared in Example 2 was used in place of the organic electrolyte solution prepared in Example 1.

Example 5

A lithium battery was manufactured in the same manner as in Example 3, except that about 97.0 wt % of $LiNi_{0.7}Co_{0.2}Al_{0.1}O_2$ was used in place of about 97.0 wt % of $LiCoO_2$ as a positive active material.

Comparative Examples 8 to 14

Lithium batteries were manufactured in the same manner as in Example 3, except that the organic electrolyte solutions prepared in Comparative Examples 1 to 7 were used in place of the organic electrolyte solution of Example 1.

Comparative Example 15

A lithium battery was manufactured in the same manner as in Example 3, except that about 97.0 wt % of $LiNi_{0.7}Co_{0.2}Mn_{0.1}O_2$ was used in place of about 97.0 wt % of $LiCoO_2$ as a positive active material.

Evaluation Example 1: Evaluation of Thickness Characteristics after High-Temperature (60° C.) Storage The lithium batteries manufactured in Examples 3 and 4 and Comparative Examples 8 to 14 were each charged at a constant current of 0.2 C rate at about 25° C. to a voltage of about 4.45 V, and then charged at a constant voltage of about 4.45 V to a current of about 0.05 C. The thicknesses of the lithium batteries were then measured, and the charged lithium batteries were stored in an oven at a temperature of about 60° C. for 21 days. Thereafter, the thicknesses of the lithium batteries were measured again to compare the thicknesses with the initial thicknesses. The results thereof are shown in Table 1.

TABLE 1

| | Initial thickness (mm) | Thickness after 21-day storage (mm) | Thickness increase rate (%) |
|---|---|---|---|
| Example 3 | 4.21 | 4.80 | 13.9 |
| Example 4 | 4.19 | 4.42 | 5.5 |
| Comparative Example 8 | 4.27 | 7.69 | 80.1 |
| Comparative Example 9 | 4.17 | 5.79 | 38.9 |
| Comparative Example 10 | 4.15 | 5.28 | 27.2 |
| Comparative Example 11 | 4.14 | 6.25 | 51.1 |
| Comparative Example 12 | 4.17 | 4.79 | 14.9 |
| Comparative Example 13 | 4.15 | 4.45 | 7.4 |
| Comparative Example 14 | 4.14 | 4.87 | 17.6 |

As may be seen in Table 1, the lithium batteries including the organic electrolyte solutions of Examples 3 and 4 had significantly improved reduction effect of thickness increase rate at a high temperature, as compared with the lithium batteries including the organic electrolyte solutions of Comparative Examples 8 to 11 (not including a succinonitrile-based compound) and the lithium battery including the organic electrolyte solution of Comparative Example 14 (including a succinonitrile-based compound only without a compound represented by Formula 1 or Formula 2). The lithium batteries including the organic electrolyte solutions of Examples 3 and 4 were, even with the same amount, also found to have improved reduction effect of thickness increase rate at a high temperature, as compared with the lithium batteries including the organic electrolyte solutions of Comparative Examples 12 and 13 including PS in place of Compound 1.

Evaluation Example 2: Evaluation of Thickness Characteristics after High-Temperature (60° C.) Storage The lithium batteries manufactured in Examples 4 and 5 and Comparative Example 15 were each charged at a constant current of 0.2 C rate at about 25° C. to a voltage of about 4.2 V, and then charged at a constant voltage of about 4.2 V to a current of about 0.05 C. The thicknesses of the lithium batteries were then measured, and the charged lithium batteries were stored in an oven at a temperature of about 60° C. for 21 days. Thereafter, the thicknesses of the lithium batteries were measured again to compare the thicknesses with the initial thicknesses. The results thereof are shown in Table 2.

TABLE 2

| | Initial thickness (mm) | Thickness after 21-day storage (mm) | Thickness increase rate (%) |
|---|---|---|---|
| Example 4 | 4.18 | 5.05 | 20.8 |
| Example 5 | 4.19 | 5.20 | 24.7 |

TABLE 2-continued

|  | Initial thickness (mm) | Thickness after 21-day storage (mm) | Thickness increase rate (%) |
|---|---|---|---|
| Comparative Example 15 | 4.27 | 6.05 | 44.0 |

As shown in Table 2, the lithium batteries of Example 4 and 5 including the positive active materials according to one or more embodiments were found to have significantly low thickness increase rate, as compared with the lithium battery of Comparative Example 15. Furthermore, upon comparing the lithium battery of Example 4 in Evaluation Example 1 with the lithium battery of Example 4 in Evaluation Example 2, the experimental conditions were substantially the same except the voltage that changed from 4.2 V to 4.45 V. However, the reduction effect of thickness increase rate at a high temperature was found to be significantly high in the case of charging with a voltage of 4.45 V. This may be because the first compound according to one or more embodiments may form an oxidation film on a positive electrode surface at high voltages.

Evaluation Example 3: Evaluation of Recovery Capacity Characteristics after High-Temperature (60° C.) Storage The lithium batteries of Examples 3 and 4 and Comparative Examples 8 to 14 were, in the first cycle, each charged at a constant current of 0.2 C rate at ambient temperature (about 25° C.) to a voltage of about 4.45 V, and then charged at a constant voltage of about 4.45 V to a current of about 0.05 C. Subsequently, the lithium batteries were each discharged at a constant current of 0.2 C rate to a voltage of about 2.75 V.

In the second cycle, the lithium batteries were each charged at a constant current of 0.2 C rate to a voltage of about 4.45 V, and then charged at a constant voltage of about 4.45 V to a current of about 0.05 C. Subsequently, the lithium batteries were each discharged at a constant current of 0.2 C rate to a voltage of about 2.75 V.

In the third cycle, the lithium batteries were each charged at a current of 0.2 C rate to a voltage of about 4.45 V, and then charged at a constant voltage of about 4.45 V to a current of about 0.05 C. Thereafter, the charged lithium batteries were stored in an oven at a temperature of about 60° C. for 21 days, and then, the lithium batteries were discharged at a current of 0.2 C rate to a voltage of about 2.75 V. In the fourth cycle, the lithium batteries were each charged at a constant current of 0.2 C rate to a voltage of about 4.45 V, and then charged at a constant voltage of about 4.45 V to a current of about 0.05 C. Subsequently, the lithium batteries were each discharged at a constant current of 0.2 C rate to a voltage of about 2.75 V. The evaluation results of charging and discharging are shown in Table 3.

In addition, the same experiment was performed on the lithium battery of Example 4, except that the charging voltage changed from 4.45 V to 4.2 V. The result thereof is also shown in Table 3.

Capacity retention and capacity recovery after high-temperature storage are each defined by Equations 1 and 2, respectively:

Capacity retention after high-temperature storage [%]=[discharge capacity after high-temperature storage at $3^{rd}$ cycle/standard capacity]×100 (wherein the standard capacity refers to discharge capacity at $2^{nd}$ cycle)   Equation 1

Capacity recovery after high-temperature storage [%]=[discharge capacity after high-temperature storage (discharge capacity at $4^{th}$ cycle/standard capacity]×100 (wherein the standard capacity refers to discharge capacity at $2^{nd}$ cycle).   Equation 2

TABLE 3

|  | Initial capacity (mAh) | Retention capacity (mAh) | Recovery capacity (mAh) | Capacity retention (%) | Capacity recovery (%) |
|---|---|---|---|---|---|
| Example 3 | 2659 | 1973 | 2292 | 74 | 86 |
| Example 4 | 2654 | 1975 | 2393 | 74 | 90 |
| Comparative Example 8 | 2659 | 1550 | 1658 | 58 | 62 |
| Comparative Example 9 | 2659 | 1804 | 2184 | 68 | 82 |
| Comparative Example 10 | 2655 | 1848 | 2235 | 70 | 84 |
| Comparative Example 11 | 2666 | 1860 | 2094 | 70 | 79 |
| Comparative Example 14 | 2660 | 1785 | 2015 | 67 | 76 |
| Example 4 (4.2 V) | 2615 | 1728 | 1923 | 66 | 74 |

As may be seen in Table 3, the capacity retention and the capacity recovery of the lithium batteries of Examples 3 and 4 including the organic electrolyte solutions, according to one or more embodiments, were found to be evenly increased, as compared with those of the lithium batteries of Comparative Examples 8 to 11 and 14.

In addition, when the lithium battery of Example 4 was charged at a voltage of about 4.2 V, the lithium battery was not as effective as the lithium battery of Example 4 in terms of the capacity retention and recovery.

Evaluation Example 4: Evaluation of Lifespan Characteristics after High-Temperature (45° C.) Storage The lithium batteries of Example 4 and Comparative Examples 8, 10, and 14 were, in the first cycle, each charged at a constant current of 0.2 C rate at a high temperature (about 45° C.) to a voltage of about 4.45 V, and then charged at a constant voltage of about 4.45 V to a current of about 0.05 C. Subsequently, the lithium batteries were each discharged at a constant current of 0.2 C rate to a voltage of about 2.75 V.

In the second cycle, the lithium batteries were each charged at a constant current of 1 C rate to a voltage of about 4.45 V, and then charged at a constant voltage of about 4.45 V to a current of about 0.05 C. Subsequently, the lithium batteries were each discharged at a constant current of 1 C rate to a voltage of about 3 V. This cycle of charging and discharging was repeated 100 times. The capacity retention at each cycle was measured, of which the results are shown in FIG. 1.

A capacity retention at $n^{th}$ cycle may be defined using Equation 3:

Capacity retention at $n^{th}$ cycle [%]=[discharge capacity at $n^{th}$ cycle/standard capacity]×100 (wherein the standard capacity refers to discharge capacity at $2^{nd}$ cycle).   Equation 3

Figure 1:
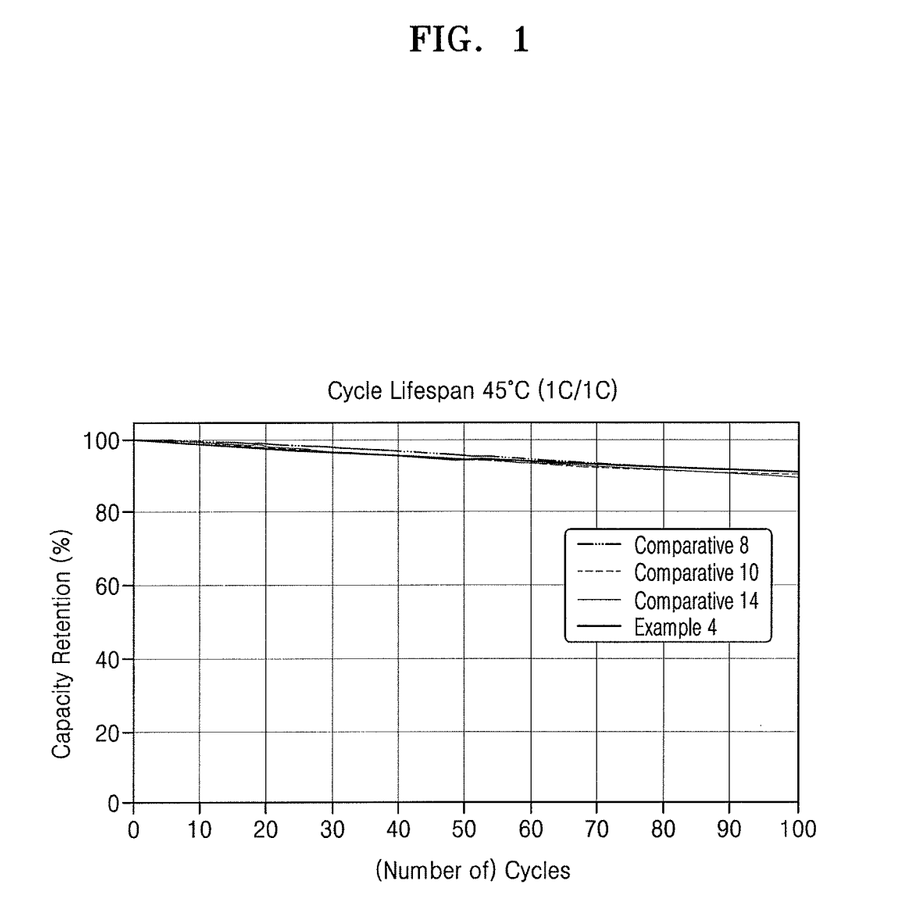
FIG. 1 illustrates a graph showing capacity retention (percent, %) versus number of cycles, illustrating lifespan characteristics of lithium batteries manufactured in Example 4 and Comparative Examples 8, 10, and 14.

As shown in FIG. 1, even when the organic electrolyte solution according to one or more embodiments is used in a lithium battery, as is in the lithium battery of Example 4, the lifespan characteristics of the lithium battery were found to be almost the same as those of lithium batteries not including the organic electrolyte solution.

For example, when the organic electrolyte solution according to one or more embodiments is used in a lithium battery, the lithium battery may have excellent characteristics after high-temperature storage without a decrease in lifespan characteristics.

Figure 2:
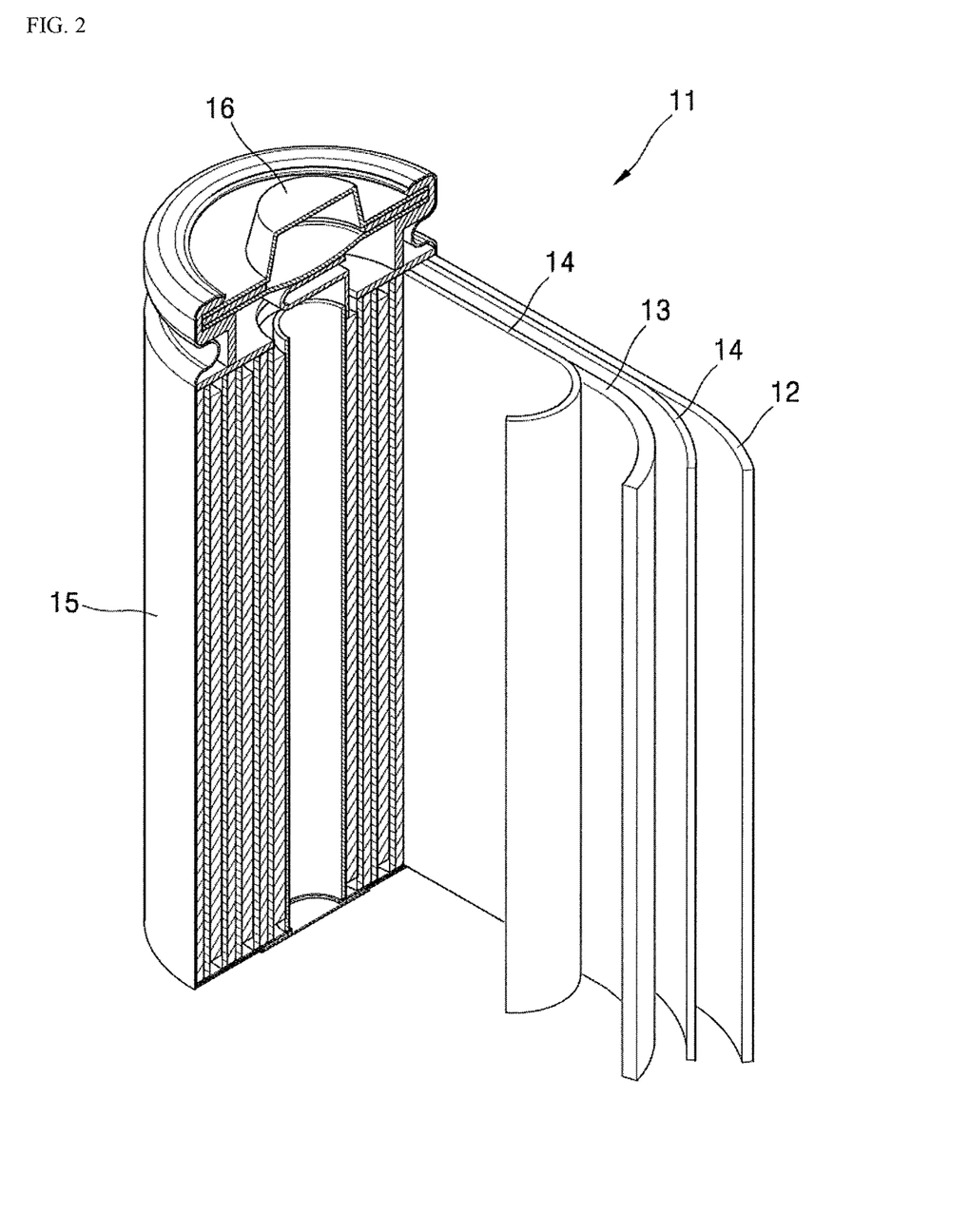
FIG. 2 illustrates an exploded perspective view of a lithium battery according to an embodiment.

FIG. 2 illustrates a lithium battery according to an embodiment. As shown in FIG. 2, a lithium battery 11 may include a positive electrode 13, a negative electrode 12, a separator 14. The positive electrode 13, the negative electrode 12, and the separator 14 may be wound and/or folded to be accommodated in a battery case 15. Then, an organic electrolyte solution, e.g., the organic electrolyte solution according to an embodiment, may be injected into the battery case 15, and the battery case 15 may be sealed with a cap assembly 16, thereby completing the manufacture of the lithium battery 11. In an implementation, the battery case 15 may have a shape of a cylinder, a box, or a film. In an implementation, the lithium secondary battery 11 may be a thin-film type battery. In an implementation, the lithium secondary battery 11 may be a lithium ion battery.

By way of summation and review, a lithium battery operating at a high driving voltage may be incompatible with an aqueous electrolyte solution that is highly reactive to lithium. For this reason, a lithium battery may use an organic electrolyte solution. The organic electrolyte solution may be prepared by dissolving a lithium salt in an organic solvent. An appropriate organic solvent may be stable at high voltages, may have a high ionic conductivity, a high dielectric constant, and a low viscosity.

Using an organic electrolyte solution including a lithium salt in a lithium battery may cause a side reaction between a negative electrode and/or a positive electrode and an electrolyte solution, and consequentially may lead to a decrease in battery characteristics and high-temperature stability of the lithium battery. For example, a reaction between a positive active material and an electrolyte solution at high temperatures may cause gas generation, an increase in electrode resistance, destruction of a solid electrolyte interface (SEI) layer on a negative active material surface at high temperatures, and continuous formation of by-products, consequentially leading to acceleration of an irreversible reaction of the lithium battery. Due to these factors, the lithium battery may exhibit battery performance decrease and thickness swelling due to gas.

The embodiments may provide an organic electrolyte solution that provides a lithium battery with improved battery characteristics and high-temperature stability.

As described above, according to one or more embodiments, a lithium battery may have improved high-temperature characteristics by using an organic electrolyte solution including a combination of compounds.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An organic electrolyte solution, comprising:
an organic solvent;
a lithium salt;
a first compound, the first compound being represented by Formula 1 or Formula 2; and
a second compound, the second compound being a succinonitrile-based compound represented by Formula 3:

Formula 1

Formula 2

Formula 3 wherein, in Formulae 1, 2, and 3,
X is sulfur (S),
L is a substituted or unsubstituted $C_1$-$C_5$ alkylene group or a substituted or unsubstituted $C_1$-$C_5$ dialkoxy alkylene group,
R is a substituted or unsubstituted $C_1$-$C_5$ alkyl group or a $C_2$-$C_{10}$ alkenyl group,
M is an alkali metal or an alkaline earth-metal,
m is 0 or 1,
n is 1, and
$R_1$, $R_2$, $R_3$, and $R_4$ are each independently selected from hydrogen, a substituted or unsubstituted $C_1$-$C_5$ alkyl group, a substituted or unsubstituted $C_4$-$C_{10}$ cycloalkyl group, a substituted or unsubstituted $C_5$-$C_{10}$ aryl group, a substituted or unsubstituted $C_2$-$C_{10}$ heteroaryl group, a substituted or unsubstituted $C_2$-$C_{10}$ alkenyl group, a substituted or unsubstituted $C_2$-$C_{10}$ alkynyl group, a substituted or unsubstituted $C_1$-$C_5$ alkoxy group, a substituted or unsubstituted $C_1$-$C_5$ dialkoxy group, a substituted or unsubstituted $C_1$-$C_5$ alkylene amine group, and —Si($R_g$)($R_h$)($R_i$), wherein $R_g$, $R_h$, and $R_i$ are each independently a substituted or unsubstituted $C_1$-$C_5$ alkyl group.

2. The organic electrolyte solution as claimed in claim 1, wherein:
the first compound is represented by Formula 1, and
the first compound represented by Formula 1 is represented by Formula 1A, Formula 1C, or Formula 1D:

Formula 1A

-continued

Formula 1C

Formula 1D wherein, in Formulae 1A, 1C, and 1D,
m is 0 or 1, and
n is 1.

3. The organic electrolyte solution as claimed in claim 1, wherein the organic electrolyte solution includes the first compound in an amount of about 0.01 percent by weight (wt %) to about 5 wt %, based on a total weight of the organic electrolyte solution.

4. The organic electrolyte solution as claimed in claim 1, wherein the organic electrolyte solution includes the second compound in an amount of about 0.01 wt % to about 10 wt %, based on a total weight of the organic electrolyte solution.

5. The organic electrolyte solution as claimed in claim 1, wherein a weight ratio of the first compound to the second compound is about 1:1 to about 1:5.

6. The organic electrolyte solution as claimed in claim 1, wherein the organic solvent includes at least one of ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), butylene carbonate, ethyl propionate (EP), ethyl butyrate, acetonitrile, dimethyl sulfoxide, dimethylformamide, dimethylacetamide, γ-valerolactone, γ-butyrolactone (GBL), and tetrahydrofuran.

7. The organic electrolyte solution as claimed in claim 1, wherein the lithium salt includes at least one of $LiPF_6$, $LiBF_4$, $LiSbF_6$, $LiAsF_6$, $LiClO_4$, LiBr, $CH_3SO_3Li$, $(CF_3SO_2)_2NLi$, chloroborane lithium, lower aliphatic carbonic acid lithium, 4-phenyl boric acid lithium, imide, $LiCF_3SO_3$, $LiCF_3CO_2$, $LiB_{10}Cl_{10}$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$, in which x and y are each an integer of 1 to 20, LiCl, and LiI.

8. The organic electrolyte solution as claimed in claim 1, wherein a concentration of the lithium salt is about 0.01 M to about 5.0 M.

9. The organic electrolyte solution as claimed in claim 1, wherein, in Formula 3, at least one of $R_1$, $R_2$, $R_3$, and $R_4$ is a substituted or unsubstituted $C_1$-$C_5$ alkyl group, a substituted or unsubstituted $C_4$-$C_{10}$ cycloalkyl group, a substituted or unsubstituted $C_5$-$C_{10}$ aryl group, a substituted or unsubstituted $C_2$-$C_{10}$ heteroaryl group, a substituted or unsubstituted $C_2$-$C_{10}$ alkenyl group, a substituted or unsubstituted $C_2$-$C_{10}$ alkynyl group, a substituted or unsubstituted $C_1$-$C_5$ alkoxy group, a substituted or unsubstituted $C_1$-$C_5$ dialkoxy group, a substituted or unsubstituted $C_1$-$C_5$ alkylene amine group, or —Si($R_g$)($R_h$)($R_i$), wherein $R_g$, $R_h$, and $R_i$ are each independently a substituted or unsubstituted $C_1$-$C_5$ alkyl group.

10. A lithium battery, comprising:
a positive electrode;
a negative electrode; and
the organic electrolyte solution as claimed in claim 1.

11. The lithium battery as claimed in claim 10, wherein the negative electrode includes graphite.

12. The lithium battery as claimed in claim 10, wherein the positive electrode includes a positive active material having a layered structure.

13. The lithium battery as claimed in claim 10, wherein an operating voltage of the lithium battery is 4.2 volts (V) or greater.

14. The lithium battery as claimed in claim 12, wherein the positive active material is represented by Formula 4:

$$LiCo_{1-s}M'_sO_2 \qquad \text{Formula 4}$$

wherein, in Formula 4,
M' is at least one of nickel (Ni), manganese (Mn), aluminum (Al), copper (Cu), iron (Fe), magnesium (Mg), chromium (Cr), zinc (Zn), boron (B), and gallium (Ga), and
$0 \leq s \leq 0.5$.

15. The lithium battery as claimed in claim 12, wherein the positive active material is represented by Formula 5:

$$Li_t(Ni_{1-u-v}Co_uAl_v)O_2 \qquad \text{Formula 5}$$

wherein, in Formula 5,
$0.96 \leq t \leq 1.05$, $0 \leq u \leq 0.2$, and $0 \leq v \leq 0.1$.

16. The organic electrolyte solution as claimed in claim 1, wherein:
the organic solvent includes ethylene carbonate, diethyl carbonate, ethyl propionate, and γ-butyrolactone,
the lithium salt includes $LiPF_6$,
the first compound includes the following Compound:

and
the second compound includes succinonitrile.

17. The organic electrolyte solution as claimed in claim 1, wherein the organic electrolyte solution consists of:
the organic solvent;
the lithium salt;
the first compound; and
the second compound.

* * * * *